July 24, 1934.  J. R. KOVAR  1,967,826
CLUTCH MECHANISM FOR POWER LIFTS OR THE LIKE
Filed Dec. 12, 1931
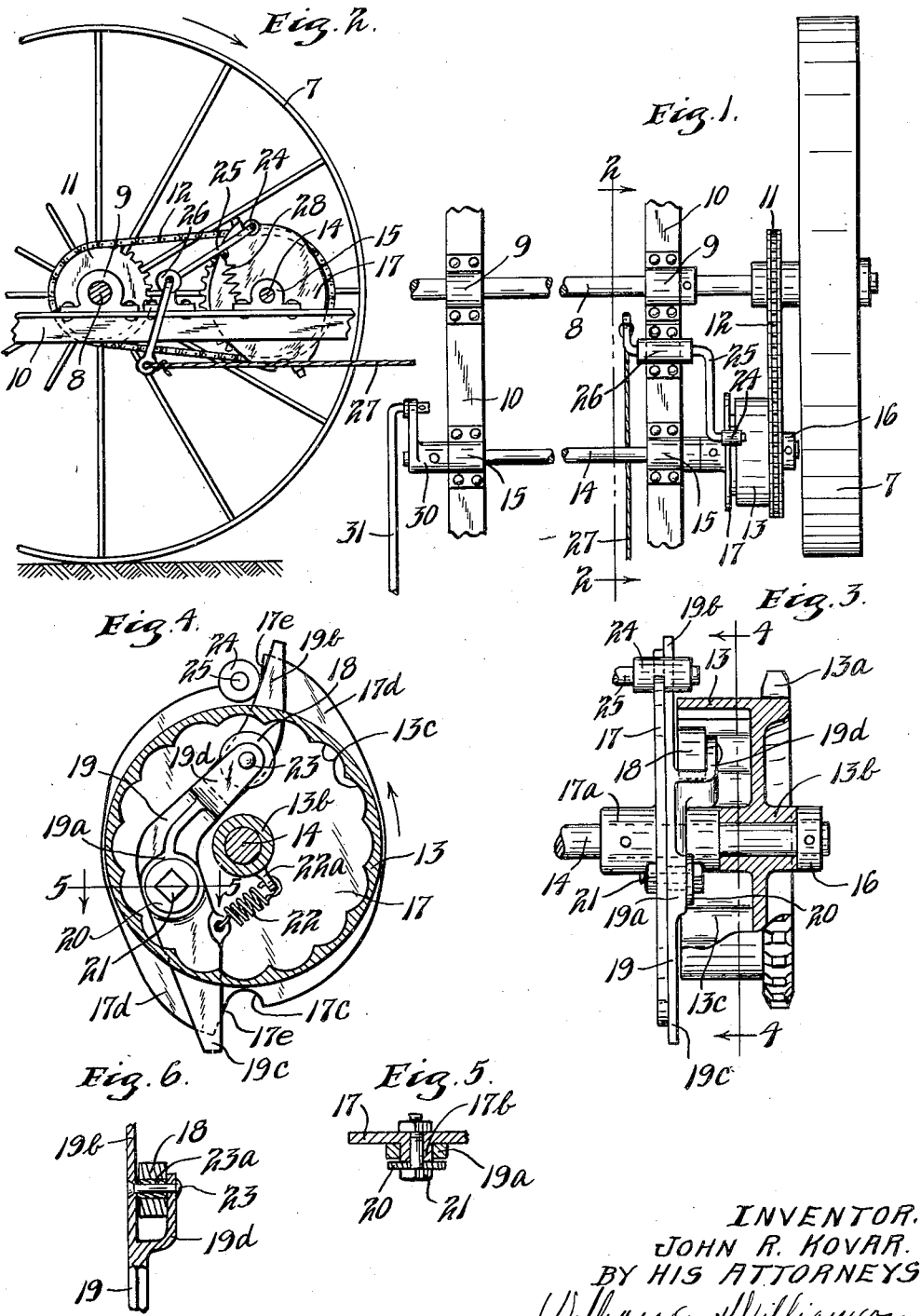
INVENTOR.
JOHN R. KOVAR.
BY HIS ATTORNEYS.

Patented July 24, 1934

1,967,826

UNITED STATES PATENT OFFICE 1,967,826

CLUTCH MECHANISM FOR POWER LIFTS OR THE LIKE

John R. Kovar, Anoka, Minn.

Application December 12, 1931, Serial No. 580,656

2 Claims. (Cl. 192—62)

This invention relates to power lift mechanism for implements such as plows, harrows, cultivators and the like and more particularly to such mechanisms which derive their power from the traveling of the implement, usually from one of the supporting wheels.

It is an object of my invention to provide an improved and greatly simplified power lift mechanism of the class described which derives its power from one of the supporting wheels, which is constructed and associated with the wheel to provide an efficient and rigid drive with the least possible mechanism.

A further object is to provide a simplified power lift mechanism of the class described which will withstand hard continuous usage, which will function smoothly at all times and which may be manufactured at relatively low cost.

In many of the well known power lifts extensively utilized at this time the clutch dogs wear and fracture within a relatively short time due to complexity of parts, excess friction upon the bearings and lack of adequate strength in their construction. The mechanism for translating rotary motion derived by a clutch engagement with the driving member in many instances is complicated, unwieldy and easily fractured or rendered inoperative.

My improved mechanism provides a very strong, rugged power lift utilizing a minimum number of parts and adapted to overcome the objectionable features above stated.

The above and other objects of the invention will be more apparent from the following description made in connection with the accompanying drawing, in which like reference characters refer to similar parts throughout the several views, and wherein:—

Fig. 1 is a fragmentary top plan view showing portions of the frame and a wheel of the implement, which may be a cultivator, plow, harrow or the like and having an embodiment of my power lift mechanism operatively associated therewith;

Fig. 2 is a cross section taken on the line 2—2 of Fig. 1 showing most of my mechanism and the wheel of the implement in side elevation;

Fig. 3 is a fragmentary view partly in side elevation and partly in vertical section showing the sprocket carrying drum, the clutch dog and part of the operating mechanism;

Fig. 4 is a cross section taken on the line 4—4 of Fig. 3;

Fig. 5 is a detail sectional view showing the pivotal mounting of the clutch dog and taken approximately along the line 5—5 of Fig. 4, and Fig. 6 is a detail side elevation showing the roller carrying fork of the clutch dog and the mounting of the clutch roller.

As shown in the drawing, the numeral 7 indicates one of the wheels of a soil working implement mounted on an axle 8 which, as shown, is journaled in bearings 9, said bearings being affixed to parallel frame members 10, of the implement. A sprocket gear 11 is rigidly affixed to the hub of wheel 7 or if desired to the axle 8 and is drivably connected by a chain 12 with a larger sprocket gear 13a rigidly carried by or formed integral with a clutch drum 13. Clutch drum 13 is provided with a hub 13b which is revolubly mounted upon the outer end of a transverse horizontal shaft 14 journaled in bearings 15 which may be conveniently mounted on frame members 10, said shaft extending parallel with the axle 8. A retaining collar 16 is fixed to the outer extremity of shaft 14 preventing outward displacement of clutch drum 13 and the drum is prevented from inward displacement by abutment with a hub 17a which rigidly carries a profile cam carrying disk or plate 17 and which is rigidly affixed to shaft 14. Clutch drum 13 obviously idles upon shaft 14 except when clutch engagement is made with the shaft, as will later be more fully explained and at which time the shaft 14 and its associated mechanism is driven through only 180 degrees of rotation.

The clutch drum 13 as clearly shown in Fig. 4 is provided with a series of circumferentially arranged and longitudinally extending arcuate grooves or recesses 13c which cooperate with a roller 18 or other clutch element carried by a clutch dog 19 which is pivotally mounted on the interior and adjacent face of cam carrying plate 17. Clutch dog 19 is of generally angular shape and has a substantially central hub 19a which is loosely and pivotally mounted upon a boss 17b integrally formed with the cam carrying plate 17. Boss 17b, as clearly shown in Fig. 5, is of somewhat greater height than the thickness of the clutch dog hub 19a and a retaining disk 20 is clamped against the outer end of said boss by suitable means such as a nutted bolt 21 extending axially through the retaining disk and the boss. The roller carrying end of clutch dog 19 is urged outwardly, as shown, by means of a coiled spring 22 connecting the opposite end of the clutch dog with an attachment lug 22a carried by hub 17a. The ends of clutch dog 19 terminate in clutch fingers 19b and 19c respectively, said fingers extending, as shown, slightly beyond the peripheral camming edge of the plate 17. Roller 18 is journaled in a Y-shaped integral portion 19d of dog 19 disposed intermediately between hub 19a and the upper clutch finger 19b. The clutch dog is very ruggedly constructed and as shown a reinforcing web connects the roller carrying Y with the hub 19a. Roller 18 is loosely and pivotally mounted on a spacer bushing 23a which is interposed between the arms of Y-shaped portion 19d of the dog and a pin 23 secures said spacing bushing to the Y mounting. With this construction it will be seen that no binding upon the ends of roller 18 is possible under any condition.

Plate or disk 17 is shaped as shown in Fig. 4 and is provided with two semi-circular notches 17c which are spaced on its circumference 180 degrees apart and into either of which a retaining roller 24 may drop to normal position for rendering the lifting mechanism inoperative. Between depressions 17c on both sides of plate 17 profile cams 17d are provided similar in shape and having their high points disposed at counter-clockwise ends of the cams, as shown in Fig. 4, forming abutments 17e.

Retaining roller 24 is revolubly carried by a crank wrist of an operating bell crank lever 25 which may be conveniently journaled in a bearing 26 fixed to one of the frame members 10 adjacent cam carrying plate 17. A flexible operating member, such as a rope 27 is connected with the shorter arm of bell crank lever 25 and a small spring 28 (see Fig. 2) as well as the weight of the retaining end of bell crank lever 25 urges retaining roller 24 against the periphery of the cam carrying plate 17.

The clutch fingers 19b and 19c are adapted to be successively engaged by the retaining roller 24 to retract clutch roller 18 from engagement with the clutch recesses 13c of the drum, as clearly shown in Fig. 4.

Driving shaft 14 carries at its outer end a heavy crank 30 which is pivotally connected at its outer end with the crank wrist or turned end of an operating link or pitman 31. Said operating link extends longitudinally of the machine or implement and is connected at its opposite end with suitable rocker levers or the like which directly lift the ground working elements, such as plows, harrow tooth bars or cultivator shovels.

*Operation*

Assuming that the cultivator or other implement is traveling in a forward direction, then wheel 7, viewed as in Fig. 2, rotates in a clockwise direction, as indicated by the arrows. Clutch drum 13 is consequently driven in the same direction and under normal circumstances, simply idles upon shaft 14. If the operator desires to automatically lift the ground working elements for any of numerous reasons, such as to clear obstructions or turn around, he merely pulls upon operating rope 27 thereby swinging bell crank operating lever 25 and releasing engagement of retaining roller 24 with one of the semi-circular notches 17c formed in the peripheral edge of cam carrying plate 17. This action immediately releases one of the clutch fingers (19b or 19c) whereupon the clutch dog 19 is swung by spring 22 to effect driving engagement between roller 18 and the recesses 13c of the clutch drum. Plate 17 and driving shaft 14 are then driven by clutch drum 13 through 180 degrees at which time retaining roller 24 passes over one of the profile cams 17d and drops into the second notch 17c immediately thereafter striking the second clutch finger 19c or 19b as the case may be and retracting the clutch dog and arresting the operation of shaft 14. The 180 degree revolution of shaft 14 produces a maximum throw upon crank 30 and its connected link or pitman which serves to lift the ground working elements.

To again lower the ground working elements the operating rope 27 is again pulled again releasing the clutch dog 19 to effect driving connection between the drum 13 and shaft 14 whereupon operating shaft 14 is again driven through a 180 degree revolution returning the crank and its connecting link or pitman to the position shown in Fig. 1 and lowering the ground working elements into operative position.

It will be noted that the operating shaft 14 always rotates both for raising and lowering the ground working elements in the same direction and through 180 degrees. No injury can be effected upon the mechanism or the soil treating elements if operating rope 27 is inadvertently pulled or operating bell crank lever 25 inadvertently was struck and became displaced since the shaft 14 will merely be connected for driving for 180 degrees and the ground working elements will be simply lifted or raised.

Attention is called to the exceedingly few working parts of this device, the strength and durability of its structure in cooperation with the wheel and axle of the implement and the simplified crank throw mechanism for operating the plow or soil working element lifting means. The pivotal mounting of the clutch dog 19 positively removes all frictional wear from the apertured hub of said dog, the dog will always swing free and will not fracture after continuous hard use. It will also be noted that the mounting for roller 18 is extremely strong in structure and assures freedom of rotation of the roller thus preventing flatting or wearing at concentrated points which is common in many plow lift structures extensively utilized at this time. Extensive actual use of the mechanism has shown a high degree of efficiency and strength for the work intended.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:—

1. Power lift mechanism of the class described comprising a power take off shaft, a clutch drum journaled upon said shaft and connected for driving with a source of power, a driven member fixed to said power take off shaft and positioned adjacent the open end of said drum, an angularly shaped clutch dog pivoted at its medial portion to said driven member and having extended ends or fingers projecting outwardly between said drum and said driven member and extending beyond the external periphery of said drum and located approximately 180 degrees apart with reference to the axis of said driven member, said clutch dog having a flat face disposed against said driven member and having intermediate of its pivot and one of said fingers a rigid fork formed by one of the arms of said dog and a relatively short offset arm rigidly connected therewith, a clutch roller journaled in said fork and disposed internally of said drum, said drum having a series of clutch elements upon the inner periphery thereof adapted to be engaged by said roller, means associated with said clutch dog for urging said roller outwardly into engagement with said drum, a pair of cams formed upon the edge of said driven member, said cams being separated by diametrically opposite retaining portions in the edge of said driven member, a releasable operating member independently mounted adjacent said driven member and having a retaining element adapted to ride over said camming surfaces, engage said fingers and be seated in said last mentioned retaining portions to release said dog.

2. Power lift mechanism of the class described comprising a power take off shaft, a clutch drum journaled upon said shaft and connected for driving with a source of power, a driven plate fixed to said power take off shaft and positioned adjacent the open end of said drum, an angularly shaped clutch dog pivoted at its medial portion to said driven plate, said dog comprising an integral member having a flat rear surface disposed against said plate and having elongated ends terminating in fingers which extend beyond the external periphery of said drum and are located approximately 180 degrees apart with reference to the axis of said plate, said integral clutch dog including an integrally formed fork diverging from a portion thereof intermediate of said shaft and one of said ends and in the form of an angularly bent offset arm, a clutch roller journaled in said fork and disposed internally of said drum, said drum having a series of circumferentially arranged clutch elements upon the inner periphery thereof for engagement with said roller, means for urging said dog outwardly to engage said drum, a pair of cams formed upon the edge of said plate, said cams being separated by diametrically opposite retaining portions in the edge of said plate, a releasable operating member independently mounted adjacent said plate and having a retaining element adapted to ride over said camming surfaces, engage said fingers and be seated in said last mentioned retaining portions to release said dog.

JOHN R. KOVAR.